United States Patent [19]

Sato et al.

[11] 4,049,593

[45] Sept. 20, 1977

[54] INORGANIC SUBSTANCE COMPOSITION AND PROCESS FOR PRODUCING SAME

[75] Inventors: Hiroshi Sato; Munehiro Okumura; Fujio Itani; Shouji Fujii; Tsutomu Kakuda; Hiroshi Nakatui, all of Otake, Japan

[73] Assignee: Mitsubishi Rayon Co., Ltd., Tokyo, Japan

[21] Appl. No.: 733,919

[22] Filed: Oct. 19, 1976

Related U.S. Application Data

[63] Continuation of Ser. No. 428,193, Dec. 26, 1973, abandoned.

[30] Foreign Application Priority Data

Dec. 29, 1972  Japan ..................... 47-1565

[51] Int. Cl.$^2$ .............................. C08J 3/12
[52] U.S. Cl. ............... 260/2.5 E; 260/2.5 R; 260/2.5 AK; 260/2.5 N; 260/2.5 HA; 260/2.5 HB; 260/37 R; 260/37 N; 260/37 PC; 260/40 R; 260/42.43; 260/42.46; 260/42.48; 260/42.49; 260/42.51; 260/42.52; 264/13
[58] Field of Search .......... 260/2.5 E, 2.5 N, 2.5 AK, 260/2.5 HA, 2.5 HB, 2.5 R; 264/13

[56] References Cited

U.S. PATENT DOCUMENTS

| | | | |
|---|---|---|---|
| 3,711,438 | 1/1973 | Susuki et al. | 260/42.46 |
| 3,770,856 | 11/1973 | Ueki et al. | 264/13 |
| 3,875,270 | 4/1975 | Haefner et al. | 264/13 |
| 3,944,639 | 3/1976 | Osajima et al. | 264/13 |
| 3,987,139 | 10/1976 | Kozlowski et al. | 264/13 |

*Primary Examiner*—James H. Derrington
*Attorney, Agent, or Firm*—Armstrong, Nikaido & Marmelstein

[57] ABSTRACT

An inorganic substance composition comprising at least 50% by weight of a finely divided inorganic substance and 2 to 50% by weight of a fiber forming organic polymeric material and having a specific surface area of more than 2 m$^2$/g is described. The composition is prepared by preparing a liquid suspension from the inorganic substance, the organic polymeric material and a solvent; heating the liquid suspension to at least 100° C to dissolve the organic polymeric material in the solvent; and then extruding the heated liquid suspension at a pressure equal to or higher than the vapor pressure of the solvent through an orifice into a zone of a lower pressure to evaporate the solvent.

10 Claims, No Drawings

INORGANIC SUBSTANCE COMPOSITION AND PROCESS FOR PRODUCING SAME

This is a continuation of application Ser. No. 428,193 filed Dec. 26, 1973 now abandoned.

The present invention relates to a novel inorganic substance composition composed of a predominant amount of a finely divided inorganic substance and a minor amount of a fiber forming synthetic polymeric material wherein said finely divided inorganic substance is incorporated so that its useful properties may effectively be utilized. It also relates to a process for producing such an inorganic substance composition.

Attempts have been made to improve or modify the properties of organic polymeric materials by incorporating finely divided inorganic substances, and some of them are widely practiced in the manufacture of rubber, fibers, papers, molded articles, films and paints. In these fields finely divided inorganic substances are utilized as a reinforcing agent, or for the purpose of enhancing dimensional stability, rigidity, heat resistance, weatherability or printing properties, or as a filler to reduce the cost of the product. Inorganic substances have inherent properties, which cannot be seen in organic polymeric materials, such as high resistance to thermal distortion, high rigidity and high surface activity. These useful properties of inorganic substances have heretofore not been fully utilized in many cases.

It has been found that in order to fully utilize the beneficial properties of a finely divided inorganic substance it should be present in the product in an amount of at least 50% by weight based on the weight of the product, and the product should have a specific surface area of more than 2m$^2$/g.

Thus, in accordance with one aspect of the present invention there is provided an inorganic substance composition comprising at least 50% by weight of a finely divided inorganic substance and 2 to 50% by weight of a fiber forming organic polymeric material and having a specific surface area of more than 2 m$^2$/g.

In accordance with another aspect of the present invention there is provided a process for producing an inorganic substance composition which comprises the steps of:

1. preparing a liquid suspension from the following three components;
   a. a finely divided inorganic substance, in an amount which equals in weight at least 50% of the total weight of this component and component (b) below,
   b. a fiber forming organic polymeric material, in an amount which equals in weight 2 to 100% of the weight of the component (a), and
   c. a solvent capable of dissolving the component (b) at a temperature of at least 100° C;
2. heating the liquid suspension a temperature of at least 100° C to dissolve the component (b) in the component (c); and then,
3. extruding said heated liquid suspension under a pressure equal to or higher than the vapor pressure of the component (c) through an orifice into a zone of a lower pressure to evaporate the component (c) therefrom.

The inorganic substance composition of the present invention is characterized as having a specific surface area of at least 2 m$^2$/g, preferably at least 10 m$^2$/g, and being usually in the form of a fibril-like, fine fibrous, fine flake-like, arborescent or fine web-like, porous structure having numerous fine, irregular voids therein.

The "specific surface area" used herein is the ratio of the surface area per unit weight of the inorganic substance composition, determined by BET adsorption method. The specific surface area should be at least 2 m$^2$/g and preferably at least 10 m$^2$/g. When the specific surface area is lower than 2 m$^2$/g, the inorganic substance composition is restricted in its use. For example, when the inorganic substance composition is used as an artificial soil, it is poor in hygroscopic property, adsorption of the effective components of fertilizer, and promotion in growth of roots. When used as adsorbent, it is poor in adsorption capacity. When used as a filter material, it is poor in filtration capacity. When used as sheet or paper stock, it is poor in dispersibility in a liquid medium, beatability and a paper making performance.

The "finely divided inorganic substance" referred to herein means inorganic particles capable of passing through a 100 mesh screen of Japanese Industrial Standard and has a maximum size of up to 500 μ. Illustrations of such inorganic substance include, for example, asbesto, alumina, antimony trioxide, barite, calcium carbonate, calcium sulfate, kaolin clay, carbon black, diatomaceous earth, feldspar powder, terra abla, quartz, graphite, magnesium carbonate, magnesium hydroxide, magnesium oxide, mica, molybdenum disulfide, agalmatolite clay, sericite, pyrogenic silica, finely divided silicic acid, silica amorphous, silica sand, silicate, titanium oxide, whiting, slate powder and the like. These inorganic substances may be used either alone or as a mixture of two or more of these inorganic substances.

The "polymeric material" referred to herein means a fiber-forming organic linear high molecular weight compound, which may have stabilizers, antistatics, flame retardants and other conventional additives. Examples of the polymeric materials are polyolefins, such as polyethylene, polypropylene, polybutene-1, polystyrene and polyisobutylene; polyamides such as polyhexamethylene sebacamide, polycaprolactam and polypyrrolydone; polyesters, such as polyethylene terephthalate, poly-β-valerolactone, and poly-p(β-hydroxyethoxy) benzoate; polycarbonates, polyurethanes, polyethers such as polyoxymethylene and poly-p-(2,6-dimethylphenoxide); homopolymers and copolymers of vinyl compounds, such as acrylonitrile, vinyl chloride, vinyl acetate, vinylidene chloride, and methyl methacrylate; a copolymer of vinyl alcohol and ethylene obtained by hydrolysis of a copolymer of vinyl acetate and ethylene. These polymeric materials may be used either alone or as a mixture of two or more of these polymeric materials.

Properties of typical polymeric materials and finely divided inorganic substances which may be employed in the practice of the invention are listed in Tables I and II.

Table I

| Finely Divided Inorganic Substance | Particle Size (Micron) | $V_f$ (cc/g) | $V_a$ (cc/g) | Specific Surface Area (m$^2$/g) |
|---|---|---|---|---|
| Finely Divided Silicic Acid A (SiO$_2$.nH$_2$O) | Average 0.020 | 0.50 | 1.91 | 150 |
| Finely Divided Silicic Acid B (SiO$_2$.nH$_2$O) | Average 0.040 | 0.51 | 2.09 | 80 |
| Diatomaceous Earth | 95% 10 or less | 0.55 | 1.50 | 20 |
| Magnesium Carbonate | Average 0.1 | 0.46 | 1.81 | 20 |

Table I-continued

| Finely Divided Inorganic Substance | Particle Size (Micron) | $V_f$ (cc/g) | $V_a$ (cc/g) | Specific Surface Area (m²/g) |
|---|---|---|---|---|
| Clay | 98% 2 or less | 0.38 | 0.72 | 20 |
| Talc | 98% 4 or less | 0.37 | 0.87 | 13 |
| Calcium Carbonate A | Average 1.4 | 0.38 | 1.10 | 6 |
| Calcium Carbonate B | Average 4.0 | 0.40 | 0.70 | 2 |
| Magnesium Carbonate/ Calcium Carbonate (4/3 by weight) | — | 0.43 | 1.39 | 14 |
| Finely Divided Silicic Acid B/Calcium Carbonate (3/2 by weight) | — | 0.46 | 1.49 | 50 |
| Diatomaceous Earth/ Calcium Carbonate (4/3 by weight) | — | 0.40 | 1.31 | 14 |
| Magnesium Carbonate/ Talc (4/3 by weight) | — | 0.42 | 1.29 | 12 |

Table II

| Polymer | $V_p$ (cc/g) | Softening point (° C) |
|---|---|---|
| High Density Polyethylene | 1.05 | 135 |
| Law Density Polyethylene | 1.10 | 100 |
| Crystalline polypropylene | 1.09 | 160 |
| Polyacrylonitrile | 0.86 | 232 |
| Polyethylene Terephthalate | 0.77 | 200 |
| Polyvinyl Chloride | 0.70 | 150 |
| Polystyrene | 0.95 | 160 |
| Nylon-66 | 0.88 | 240 |
| Polymethyl Methacrylate | 0.84 | 140 |

In Table I, $V_a$ is the bulkiness of the finely divided inorganic substance and is measured under a load of 10 kg/cm² in a manner as noted below.

The measurement is carried out at a temperature of 25° C and under dry conditions using a cylinder of 15 cm in height and $2/\sqrt{\pi}$ cm inner diameter having a removable flat bottom and equipped with a plunger movable up and down by means of an air-cylinder and capable of applying a load of 10 kg/cm². A predetermined portion (Wg) of the finely divided inorganic substance to be measured is weighed and placed in the cylinder. The sample in the cylinder is then leveled by gently knocking the cylinder with a wood hammer. A load of 10 kg/cm² is then applied on the plunger via the air-cylinder and allowed to stand for 1 minute. The plunger is then lifted. Another portion (Wg) of the sample is introduced to the cylinder and the general procedure as described above is repeated. The procedure is repeated 10 times in total. The volume of the sample (10 × Wg) stacked in the cylinder is measured, and the bulkiness of the sample is calculated therefrom. The value of W employed in this measurement depends on the particular finely divided inorganic substance and the process for preparing the substance and is determined in a manner as follows. An appropriate portion of the sample is weighed and placed in a scaled glass cylinder of an inner diameter of $2/\sqrt{\pi}$ cm and a length of 30 cm and having a flat bottom so that the cylinder may be filled to a depth of about 20 cm with the sample. The cylinder is then caused to fall a distance of 2 cm onto a fixed surface at a rate of 60 times per minute. The height of the sample in the cylinder is gradually lowered to an equilibrium value. From this value and the weight of the sample the bulk density of the sample is calculated and adapted as W in the above measurement.

Values of $V_f$ given in Table I were determined by a method in accordance with JIS-K-5101. Values of softening point and $V_p$ given in Table II were determined by methods in accordance with ASTM-D-1526 and JIS-K-6760, respectively.

The inorganic substance composition of the present invention is prepared by the steps of:

1. dispersing a stated amount of a finely divided inorganic substance (component a) and a stated amount of a polymeric material (component b) in a solvent (component c) capable of dissolving said polymeric material at a temperature of at least 100° C to produce a liquid suspension;

2. heating the liquid suspension to a temperature of at least 100° C to dissolve the polymeric material in said solvent; and then, 3. extruding the heated liquid suspension under a pressure equal to or higher than the vapor pressure of said substance through an orifice into a zone of a lower pressure to evaporate said solvent therefrom.

In the preparation of a liquid suspension from the three components a, b and c, mentioned above, both the manner and the order in which the three components are blended with each other are not critical. It is possible that water contained in the component a and/or component b will cause problems when the resulting composition is used in certain fields. In such a case, the water contained therein should preferably be removed, for example, by drying prior to the preparation of a liquid suspension of the three components.

Component c, i.e., a solvent capable of dissolving component b, i.e., a polymeric material at a temperature of at least 100° C, should have a boiling point lower than the softening point of the polymeric material, employed and should be capable of dissolving the polymer material, under the extrusion conditions, i.e., at elevated temperature and pressure. The solvent should be substantially inert to the polymeric material, and construction materials of which the employed equipments and composed.

Illustrative of suitable solvents, one can mention, for example, hydrocarbons such as butane, hexane, cyclohexane, pentene, benzene and toluene; halogenated hydrocarbons such as methylene chloride, chloroform, methyl chloride, propyl chloride, trichloroethylene, trichloroethane, tetrachloroethylene, tetrachloroethane, chlorobenzene, fluorotrichloromethane and 1,1,2-tricycloro-1,2,2-trifluoroethane; alcohols such as methanol, ethanol, propanol and butanol; ketones such as acetone, cyclopentanone, methyl ethyl ketone and hexafluoroacetone; esters such as methyl acetate, ethyl acetate and γ-butyrolactone, ethers such as ethyl ether, tetrahydrofuran and dioxane; nitriles such as acetonitrile and propionitrile; and trifluoroacetic acid, carbon tetrachloride, carbon disulfide, nitromethane, water, and sulfur dioxide; and a combination thereof. Depending on the nature of the particular polymeric material, a suitable solvent should be selected.

The liquid suspension of the three components is prepared in a closed vessel and heated to a temperature of at least 100° C in the vessel to dissolve the polymeric material in said solvent. The proportion of the solvent employed to the mixture of the finely divided inorganic substance and the polymeric material should desirably be such that the resulting heated suspension having the polymeric material dissolved therein will be flowable enough to be pumped. The heated suspension is maintained under an autogenous pressure of at least 5 kg/cm², preferably at least 10 kg/cm², and is extruded under this autogenous pressure or higher pressures through an orifice into a zone of a lower pressure and a lower temperature, preferably into an ambient atmosphere, to suddenly evaporate the solvent thereby leaving the desired porous structure. The last mentioned operation may be referred to as "spurting".

In the practice of the manufacture of such a structure, any suitable apparatus, including a conventional autoclave, may be employed, provided that they are equipped with an orifice through which the heated mixture may be extruded or ejected under elevated temperature and pressures. Conveniently, a continuous extruder can be employed, comprising a pressing zone, compressing zone, heating zone, metering zone and an extrusion head having an orifice or orifices.

The porous structure so obtained can be beaten in a liquid medium incapable of dissolving the polymeric material contained in the porous structure to be formed into a uniform slurry containing so-called fibrid. A sheet or paper may be prepared from the fibrid containing slurry by a conventional paper making procedure.

Even if the polymeric material used for the preparation of the porous structure is a hydrophobic polyolefin, the porous structure can be successfully beaten and/or disintegrated in an aqueous medium by blending a minor amount, e.g., 10% by weight based on the weight of the porous structure, of hydrophilic cellulose pulp therewith to provide a slurry, in which fibrid-like structure elements are well dispersed, from which sheets can be made.

The inorganic substance structure of the present invention may also be dispersed in a liquid medium incapable of dissolving the inorganic substance structure, such as, for example, methylene chloride and trichloroethylene, from which dispersion sheets can be made.

Sheet-like structures made from the inorganic substance composition of the present invention exhibits enhanced postprocessability when compared with similar products obtained by prior art processes, since the former structure has lower densities and contains more voids therein, and in consequence can absorb various treating agents applied thereto to a greater extent. Thus, antistatic agents, flame retardants and other additives may readily be applied to the sheet-like structure of the invention.

The sheet-like structure may be calendered at an appropriate temperature. It has been found that the calendered products have a surprisingly high initial modulus. They also have enhanced tenacity and dimensional stability. By way of an example, a calendered sheet obtained by a process in accordance with the invention and comprising 10 parts by weight of high density polyethylene and 90 parts by weight of calcium carbonate undergoes little or no shrinkage when heated to temperatures slightly below the melting point of the polyethylene. When fired, it goes on burning with little or no shrinkage. These results are surprising and quite unexpected from the behaviours of the comparable sheetlike products of polyolefin prepared by prior art processes, which undergo shrinkage to a great extent when merely approaching a heating source. The calendered sheet of the invention is superior to cellulose paper in the hydrophobic property.

If desired, the inorganic substance composition of the present invention may be used as a filler in a paper-making process. This is advantageous because, firstly, the inorganic substance composition provides a yield higher than conventional fillers and, secondly, the composition exercises no harmful influence on the characteristics of the resulting paper even if the inorganic substance composition is used in a greater amount.

If desired, a sheet-like structure may be prepared from a blend of the inorganic substance composition and a fibrous material such as natural fibers, synthetic fibers, semi-synthetic fibers, glass fibers, metal fibers and carbon fibers. The sheet-like structure generally has an improved tear strength and a good feel.

The inorganic substance composition of the present invention has several used besides the sheet-like structure illustrated above. For example, it can be used as a molding material, a heat-insulation material, a packing material, a sound-proofing material and other construction materials.

The invention will be further described in the following Examples, in which finely divided inorganic particle and polymer components are those indicated in Tables I and II, unless otherwise specified, and all parts are by weight.

EXAMPLE 1

An autoclave was charged with a mixture of 90 parts of calcium carbonate, 10 parts of high density polyethylene and 850 parts of methylene chloride, sealed, heated to a temperature of 180° C while stirring the content, and pressurized to an internal pressure of 40 kg/cm$^2$ by introducing nitrogen. The conditions were maintained for about 10 minutes. At the end of the period, the mixture was spurted through an orifice, provided at the bottom of the autoclave and having a diameter of 1.0 mm, into the atmosphere. The product so obtained was discrete flake-like structures comprising fine porous bodies having a plurality of voids therein, the thickness of the walls forming each void being less than 5 micron, and had a specific surface area of 135 m$^2$/g.

EXAMPLES 2 – 53

Following general procedure described in Example 1, a series of mixtures of a polymeric material, finely divided inorganic particles and a solvent as indicated in Table III, were separately spurted under spurting conditions indicated in Table III. The appearance of each product is also shown in the same Table. All the products are porous structures having numerous fine, irregular voids therein, the walls forming each void being less than 5 micron in thickness.

Table III

| Example No. | Charged Composition | | Spurting Conditions | Product | Specific Surface Area (m$^2$/g) |
|---|---|---|---|---|---|
| 2 | High Density Polyethylene<br>Finely Divided Silicic Acid A<br>Methylene Chloride | 10 parts<br>90 parts<br>800 parts | 140° C<br>60 kg/cm$^2$<br>Orifice Diameter<br>1 mm | Fine powder-like structure | 85 |
| 3 | High Density Polyethylene<br>Finely Divided Silicic Acid B<br>Methylene Chloride | 10 parts<br>90 parts<br>800 parts | 138° C<br>80 kg/cm$^2$<br>Orifice Diameter<br>1.5 mm | Fine sliver-like structure | 75 |
| 4 | High Density Polyethylene<br>Finely Divided Silicic Acid B | 20 parts<br>80 parts | " | " | 60 |

Table III-continued

| Example No. | Charged Composition | | | Spurting Conditions | Product | Specific Surface Area (m²/g) |
|---|---|---|---|---|---|---|
| 5 | Methylene Chloride<br>High Density Polyethylene<br>Finely Divided Silicic Acid A<br>Methylene Chloride | 800<br>15<br>85<br>850 | parts<br>parts<br>parts<br>parts | 150° C<br>55 kg/cm²<br>Orifice Diameter<br>1 mm | Fine flake-like structure | 70 |
| 6 | High Density Polyethylene<br>Finely Divided Silicic Acid B<br>Methylene Chloride | 30<br>70<br>800 | parts<br>parts<br>parts | 150° C<br>62 kg/cm²<br>Orifice Diameter<br>1.5 mm | " | 55 |
| 7 | High Density Polyethylene<br>Calcium Carbonate A<br>Methylene Chloride | 5<br>95<br>800 | parts<br>parts<br>parts | 200° C<br>60 kg/cm²<br>Orifice Diameter<br>1 mm | " | 75 |
| 8 | High Density Polyethylene<br>Calcium Carbonate B<br>Methylene Chloride | 20<br>80<br>750 | parts<br>parts<br>parts | 200° C<br>60 kg/cm²<br>Orifice Diameter<br>1 mm | Fine flake-like structure | 85 |
| 9 | High Density Polyethylene<br>Magnesium Carbonate<br>Methylene Chloride | 10<br>90<br>800 | parts<br>parts<br>parts | 150° C<br>80 kg/cm²<br>Orifice Diameter<br>1.5 mm | Fine sliver-like structure | 80 |
| 10 | High Density Polyethylene<br>Magnesium Carbonate<br>Methylene Chloride | 20<br>80<br>800 | parts<br>parts<br>parts | 200° C<br>60 kg/cm²<br>Orifice Diameter<br>1 mm | Fine flake-like structure | 105 |
| 11 | High Density Polyethylene<br>Magnesium Carbonate<br>Methylene Chloride | 15<br>85<br>820 | parts<br>parts<br>parts | 170° C<br>58 kg/cm²<br>Orifice Diameter<br>1 mm | " | 120 |
| 12 | High Density Polyethylene<br>Diatomaceous Earth<br>Methylene Chloride | 30<br>70<br>780 | parts<br>parts<br>parts | 180° C<br>59 kg/cm²<br>Orifice Diameter<br>1 mm | " | 95 |
| 13 | High Density Polyethylene<br>Diatomaceous Earth<br>Methylene Chloride | 5<br>95<br>800 | parts<br>parts<br>parts | 180° C<br>60 kg/cm²<br>Orifice Diameter<br>1 mm | " | 69 |
| 14 | High Density Polyethylene<br>Clay<br>Methylene Chloride | 5<br>95<br>750 | parts<br>parts<br>parts | 190° C<br>62 kg/cm²<br>Orifice Diameter<br>1 mm | Fine flake-like structure | 90 |
| 15 | High Density Polyethylene<br>Talc<br>Methylene Chloride | 10<br>90<br>800 | parts<br>parts<br>parts | 150° C<br>60 kg/cm²<br>Orifice Diameter<br>1 mm | Fine sliver-like structure | 80 |
| 16 | High Density Polyethylene<br>Talc<br>Methylene Chloride | 20<br>80<br>800 | parts<br>parts<br>parts | 150° C<br>62 kg/cm²<br>Orifice Diameter<br>1 mm | Fine flake-like structure | 85 |
| 17 | High Density Polyethylene<br>Finely Divided Silicic Acid A<br>Trichlorotrifluoroethane | 10<br>90<br>700 | parts<br>parts<br>parts | 200° C<br>60 kg/cm²<br>Orifice Diameter<br>1 mm | " | 110 |
| 18 | Crystalline Polypropylene<br>Finely Divided Silicic Acid B<br>Methylene Chloride | 10<br>90<br>780 | parts<br>parts<br>parts | 140° C<br>60 kg/cm²<br>Orifice Diameter<br>1 mm | " | 130 |
| 19 | Crystalline Polypropylene<br>Finely Divided Silicic Acid B<br>Methylene Chloride | 10<br>90<br>800 | parts<br>parts<br>parts | 150° C<br>62 kg/cm²<br>Orifice Diameter<br>1 mm | " | 140 |
| 20 | Crystalline Polypropylene<br>Finely Divided Silicic Acid B<br>Methylene Chloride | 20<br>80<br>800 | parts<br>parts<br>parts | 175° C<br>65 kg/cm²<br>Orifice Diameter<br>1 mm | Fine flake-like structure | 70 |
| 21 | Crystalline Polypropylene<br>Finely Divided Silicic Acid B<br>Methylene Chloride | 30<br>70<br>780 | parts<br>parts<br>parts | 160° C<br>62 kg/cm²<br>Orifice Diameter<br>1 mm | " | 80 |
| 22 | Crystalline Propylene<br>Finely Divided Silicic Acid A<br>Methylene Chloride | 5<br>95<br>810 | parts<br>parts<br>parts | 140° C<br>60 kg/cm²<br>Orifice Diameter<br>1 mm | " | 95 |
| 23 | Crystalline Polypropylene<br>Finely Divided Silicic Acid A<br>Methylene Chloride | 10<br>90<br>810 | parts<br>parts<br>parts | 150° C<br>60 kg/cm²<br>Orifice Diameter<br>1 mm | " | 95 |
| 24 | Crystalline Polypropylene<br>Magnesium Carbonate<br>Methylene Chloride | 15<br>85<br>800 | parts<br>parts<br>parts | " | " | 110 |
| 25 | Crystalline Polypropylene<br>Magnesium Carbonate<br>Benzene | 15<br>85<br>800 | parts<br>parts<br>parts | 140° C<br>65 kg/cm²<br>Orifice Diameter<br>1.5 mm | " | 120 |
| 26 | Crystalline Polypropylene<br>Magnesium Carbonate<br>Methylene Chloride | 30<br>70<br>800 | parts<br>parts<br>parts | 150° C<br>60 kg/cm²<br>Orifice Diameter<br>1 mm | Fine flake-like structure | 105 |
| 27 | Crystalline Polypropylene<br>Magnesium Carbonate<br>Methylene Chloride | 5<br>95<br>820 | parts<br>parts<br>parts | 140° C<br>30 kg/cm²<br>Orifice Diameter<br>1 mm | " | 110 |

Table III-continued

| Example No. | Charged Composition | | Spurting Conditions | Product | Specific Surface Area (m²/g) |
|---|---|---|---|---|---|
| 28 | Crystalline Polypropylene<br>Calcium Carbonate<br>Methylene Chloride | 5 parts<br>95 parts<br>750 parts | 150° C<br>60 kg/cm²<br>Orifice Diameter<br>1 mm | Fine sliver-like structure | 60 |
| 29 | Crystalline Polypropylene<br>Calcium Carbonate A<br>Benzene<br>Butane | 5 parts<br>95 parts<br>650 parts<br>150 parts | 160° C<br>65 kg/cm²<br>Orifice Diameter<br>1 mm | Fine flake-like structure | 80 |
| 30 | Crystalline Polypropylene<br>Calcium Carbonate A<br>Methylene Chloride | 20 parts<br>80 parts<br>800 parts | 150° C<br>60 kg/cm²<br>Orifice Diameter<br>1 mm | " | 50 |
| 31 | Crystalline Polypropylene<br>Finely Divided Silicic Acid/<br>Calcium Carbonate (3/2 by weight)<br>Methylene Chloride | 20 parts<br><br>80 parts<br>800 parts | 145° C<br>60 kg/cm²<br>Orifice Diameter<br>1 mm | " | 65 |
| 32 | Crystalline Polypropylene<br>Diatomaceous Earth/Calcium Carbonate (4/3 by weight)<br>Methylene Chloride | 15 parts<br><br>85 parts<br>800 parts | 160° C<br>60 kg/cm²<br>Orifice Diameter<br>1 mm | Fine flake like structure | 30 |
| 33 | Crystalline Polypropylene<br>Diatomaceous Earth<br>Methylene Chloride | 25 parts<br>75 parts<br>750 parts | " | " | 25 |
| 34 | Crystalline Polypropylene<br>Diatomaceous Earth<br>Methylene Chloride | 30 parts<br>70 parts<br>800 parts | 150° C<br>65 kg/cm²<br>Orifice Diameter<br>1 mm | " | 10 |
| 35 | Crystalline Polypropylene<br>Talc<br>Methylene Chloride | 15 parts<br>85 parts<br>800 parts | 160° C<br>60 kg/cm²<br>Orifice Diameter<br>1 mm | " | 20 |
| 36 | Crystalline Polypropylene<br>Clay<br>Methylene Chloride | 15 parts<br>85 parts<br>800 parts | 170° C<br>60 kg/cm²<br>Orifice Diameter<br>1 mm | " | 25 |
| 37 | Crystalline Polypropylene<br>Talc<br>Cyclohexane | 15 parts<br>85 parts<br>800 parts | 190° C<br>65 kg/cm²<br>Orifice Diameter<br>1 mm | " | 30 |
| 38 | Polyethylene Terephthalate<br>Calcium Carbonate<br>Methylene Chloride | 20 parts<br>80 parts<br>150 parts | 200° C<br>60 kg/cm²<br>Orifice Diameter<br>0.5 mm | Fine flake-like structure | |
| 39 | Polyhexamethylene Adipamide<br>Finely Divided Silicic Acid A<br>Water | 20 parts<br><br>80 parts<br>500 parts | 240° C<br>65 kg/cm²<br>Orifice Diameter<br>1.5 mm | " | 95 |
| 40 | Polyoxymethylene<br>Finely Divided Silicic Acid B<br>Methylene Chloride | 15 parts<br>85 parts<br>800 parts | 200° C<br>60 kg/cm²<br>Orifice Diameter<br>0.5 mm | " | 110 |
| 41 | Crystalline Polypropylene<br>Magnesium Carbonate/Calcium Carbonate (4/3 by weight)<br>Methylene Chloride | 30 parts<br><br><br>70 parts<br>800 parts | 150° C<br>55 kg/cm²<br><br>Orifice Diameter<br>1 mm | " | 105 |
| 42 | Crystalline Polypropylene<br>Magnesium Carbonate<br>Titanium Oxide<br>Methylene Chloride | 30 parts<br>65 parts<br>5 parts<br>800 parts | 160° C<br>60 kg/cm²<br>Orifice Diameter<br>1 mm | " | 85 |
| 43 | Crystalline Polypropylene<br>Magnesium Carbonate/Talc (4/3 by weight)<br>Methylene Chloride | 30 parts<br><br>70 parts<br>800 parts | " | " | 90 |
| 44 | Crystalline Polypropylene<br>Low Density Polyethylene<br>Finely Divided Silicic Acid B<br>Methylene Chloride | 20 parts<br>10 parts<br>70 parts<br>800 parts | 160° C<br>58 kg/cm²<br>Orifice Diameter<br>0.8 mm | Fine flake-like structure | 80 |
| 45 | Polyacrylonitrile<br>Finely Divided Silicic Acid A<br>Water<br>Acetonitrile | 20 parts<br>80 parts<br>300 parts<br>500 parts | 230° C<br>80 kg/cm²<br>Orifice Diameter<br>1 mm | Fine sliver-like structure | 105 |
| 46 | Crystalline Polypropylene<br>Polymethyl Methacrylate<br>Magnesium Carbonate<br>Methylene Chloride<br>Butane | 20 parts<br>10 parts<br>70 parts<br>600 parts<br>200 parts | 190° C<br>80 kg/cm²<br>Orifice Diameter<br>1 mm | Fine flake-like structure | 90 |
| 47 | Polyethylene Terephthalate<br>Finely Divided Silicic Acid A/<br>Calcium Carbonate (3/2 by weight)<br>Methylene Chloride | 10 parts<br><br><br>90 parts<br>200 parts | 200° C<br>63 kg/cm²<br>Orifice Diameter<br>0.5 mm | " | 75 |
| 48 | High Density Polyethylene<br>Magnesium Carbonate<br>Hexane | 20 parts<br>80 parts<br>750 parts | 230° C<br>65 kg/cm²<br>Orifice Diameter<br>1 mm | " | 80 |
| 49 | Polyvinyl Chloride<br>Finely Divided Silicic Acid<br>Methylene Chloride<br>Hexane | 20 parts<br>80 parts<br>300 parts<br>50 parts | 200° C<br>80 kg/cm²<br>Orifice Diameter<br>0.8 mm | Fine flake-like structure | 73 |

Table III-continued

| Example No. | Charged Composition | | | Spurting Conditions | Product | Specific Surface Area (m²/g) |
|---|---|---|---|---|---|---|
| 50 | Low Density Polyethylene<br>Finely Divided Silicic Acid B<br>Methylene Chloride | 10<br>90<br>500 | parts<br>parts<br>parts | 180° C<br>60 kg/cm²<br>Orifice Diameter<br>0.8 mm | " | 140 |
| 51 | Low Density Polyethylene<br>Magnesium Carbonate<br>Methylene Chloride | 5<br>95<br>600 | parts<br>parts<br>parts | 180° C<br>55 kg/cm²<br>Orifice Diameter<br>0.8 mm | " | 140 |
| 52 | Low Density Polyethylene<br>Finely Divided Silicic Acid A<br>Methylene Chloride | 10<br>90<br>750 | parts<br>parts<br>parts | 160° C<br>60 kg/cm²<br>Orifice Diameter<br>0.8 mm | " | 150 |
| 53 | Low Density Polyethylene<br>Diatomaceous Earth<br>Methylene Chloride | 15<br>85<br>700 | parts<br>parts<br>parts | " | " | 100 |

EXAMPLE 54

An autoclave was charged with a mixture of 10 parts of an ethylene-vinyl acetate copolymer containing 12% by weight of vinyl acetate and a specific volume of 1.08, 90 parts of finely divided silicic acid A and 800 parts of methylene chloride, sealed, heated to a temperature of 160° C while stirring the content, and pressurized to an internal pressure of 60 kg/cm² by introducing nitrogen. The conditions were maintained for about 15 minutes. At the end of the period, the mixture was spurted through an orifice, provided at the bottom of the autoclave and having a diameter of 1.0 mm, into the atmosphere.

The product so obtained was discrete porous, flake-like structures having numerous fine, irregular voids therein and had a specific surface area of 90 m²/g.

EXAMPLE 55

A slurry preparing tank was charged with a mixture of 15 parts of crystalline polypropylene powder, 85 parts of a finely divided silicic acid A, 0.2 part of β-(4-hydroxy-3,5-di-tert-butylphenyl) propionic acid ester of pentaerythrytol (antioxidant) and 800 parts of methylene chloride to prepare a slurry. The slurry was transferred by a liquid transferring pump, provided at the bottom of the slurry preparing tank, through a pipe to a heating zone where the slurry was heated to a temperature of 150° C. Then, the slurry was transferred into a homogenizing vessel maintained at a temperature of 150° C to prepare a homogeneous slurry. The slurry was spurted at a pressure of 58 kg/cm² through an orifice of an extrusion head, connected with the bottom of the homogenizing vessel, into the atmosphere. The orifice had a diameter of 1.0 mm.

The product so obtained was discrete porous, flake-like structures having numerous fine, irregular voids therein and had a specific surface area of 80 m²/g.

EXAMPLES 56 – 64

Following the general procedure described in Example 55, porous structures having numerous fine, irregular voids therein were prepared separately from a series of mixtures of a polymeric material, finely divided inorganic substance and a solvent as indicated in Table IV. The composition of the mixtures, the spurting conditions, and the appearance of each product are shown in Table IV.

Table IV

| Example No. | Charged Composition | | | Spurting Conditions | Product | Specific Surface Area (m²/g) |
|---|---|---|---|---|---|---|
| 56 | High Density Polyethylene<br>Finely Divided Silicic Acid B<br>Methylene Chloride<br>Butane | 20<br>80<br>650<br>50 | parts<br>parts<br>parts<br>parts | 220° C<br>68 kg/cm²<br>Orifice Diameter<br>1 mm | Fine sliver-like structure | 105 |
| 57 | High Density Polyethylene<br>Finely Divided Silicic Acid B<br>Methylene Chloride | 15<br>85<br>820 | parts<br>parts<br>parts | 155° C<br>60 kg/cm²<br>Orifice Diameter<br>0.5 mm | Fine flake-like structure | 100 |
| 58 | High Density Polyethylene<br>Finely Divided Silicic Acid A<br>Methylene Chloride | 15<br>85<br>850 | parts<br>parts<br>parts | 150° C<br>58 kg/cm²<br>Orifice Diameter<br>0.5 mm | " | 120 |
| 59 | High Density Polyethylene<br>Magnesium Carbonate<br>Methylene Chloride | 15<br>85<br>750 | parts<br>parts<br>parts | 200° C<br>62 kg/cm²<br>Orifice Diameter<br>1 mm | " | 85 |
| 60 | High Density Polyethylene<br>Magnesium Carbonate<br>Methylene Chloride | 20<br>80<br>800 | parts<br>parts<br>parts | 160° C<br>60 kg/cm²<br>Orifice Diameter<br>0.5 mm | " | 75 |
| 61 | Crystalline Polypropylene<br>Finely Divided Silicic Acid A<br>Methylene Chloride | 15<br>85<br>820 | parts<br>parts<br>parts | 150° C<br>58 kg/cm²<br>Orifice Diameter<br>0.5 mm | Fine flake-like structure | 105 |
| 62 | Crystalline Polypropylene<br>Magnesium Carbonate<br>Methylene Chloride | 15<br>85<br>750 | parts<br>parts<br>parts | 155° C<br>60 kg/cm²<br>Orifice Diameter<br>0.5 mm | " | 85 |
| 63 | High Density Polyethylene<br>Calcium Carbonate A<br>Benzene | 20<br>80<br>500 | parts<br>parts<br>parts | 160° C<br>58 kg/cm²<br>Orifice Diameter<br>1.0 mm | " | 70 |
| 64 | Crystalline Polypropylene<br>Magnesium Carbonate/<br>Calcium Carbonate (4/3)<br>Methylene Chloride | 30<br>70<br>800 | parts<br>parts<br>parts | 155° C<br>57 kg/cm²<br>Orifice Diameter<br>0.5 mm | " | 60 |

What we claim is:

1. An inorganic substance composition comprising about 95% by weight of a finely divided inorganic substance and about 5% by weight of a fiber forming organic linear high molecular weight synthetic polymeric material; said inorganic substance composition being in the form of fine fibrous-like, flake-like or sliver-like structures and having a specific surface area of at least 10 m$^2$/g and a porous structure containing a plurality of fine, irregular voids therein, the wall forming each void being less than 5 micron in thickness.

2. An inorganic substance composition according to claim 1, wherein said finely divided inorganic substance has a maximum size of up to 500 micron.

3. An inorganic substance composition according to claim 1, wherein said finely divided inorganic substance is at least one selected from the group consisting of finely divided silicic acid, diatomaceous earth, magnesium carbonate, clay, talc, calcium carbonate, titanium oxide, graphite, carbon black, mica, antimony trioxide, asbesto, alumina and calcium sulfate.

4. An inorganic substance composition according to claim 1, wherein said fiber forming organic polymeric material is polyethylene.

5. An inorganic substance composition according to claim 1, wherein said fiber forming organic polymer material is polypropylene.

6. An inorganic substance composition according to claim 1, wherein said fiber forming organic polymeric material is polyethylene terephthalate.

7. An inorganic substance composition according to claim 1, wherein said fiber forming organic polymeric material is polyacrylonitrile or a copolymer containing at least 50% by weight of acrylonitrile.

8. An inorganic substance composition according to claim 1, wherein said fiber forming organic polymeric material is polyvinyl chloride.

9. An inorganic substance composition according to claim 1, wherein said fiber forming organic polymeric material is polymethyl methacrylate or a copolymer containing at least 50% by weight of methyl methacrylate.

10. An inorganic substance composition according to claim 1, wherein said fiber forming organic polymeric material is at least one selected from a copolymer of vinyl acetate and ethylene, and a product prepared by hydrolysis of said copolymer.

* * * * *